United States Patent [19]

Parks et al.

[11] 3,721,745
[45] March 20, 1973

[54] POTHEAD CONSTRUCTION AND METHOD OF TERMINATING A POWER CABLE THEREWITH

[75] Inventors: Argus F. Parks; Byron G. Darnell, both of Greenville, Tex.

[73] Assignee: ESCO Manufacturing Company, Greenville, Tex.

[22] Filed: June 16, 1971

[21] Appl. No.: 153,705

[52] U.S. Cl..............174/19, 174/12 BH, 174/73 R, 174/77 R, 174/78, 277/4, 277/112, 277/212 C
[51] Int. Cl. ............................................H02g 15/22
[58] Field of Search ..174/12 BH, 19, 20, 73 R, 75 R, 174/75 D, 77 R, 78, 80

[56] References Cited

UNITED STATES PATENTS

| 2,280,711 | 4/1942 | Machlett et al................174/75 D X |
| 3,322,883 | 5/1967 | Lusk..................................174/19 X |
| 3,439,110 | 4/1969 | Lusk..................................174/19 X |
| 3,471,628 | 10/1969 | Harmon............................174/19 X |
| 3,548,070 | 12/1970 | Duenke..............................174/19 X |
| 3,571,783 | 3/1971 | Lusk............................174/73 R UX |
| 3,597,527 | 8/1971 | Lusk..................................174/73 R |

Primary Examiner—Laramie E. Askin
Attorney—Kenneth R. Glaser et al.

[57] ABSTRACT

A pothead device for termination of a power cable which is factory assembled, filled with dielectric insulating material and sealed to prevent contamination of and leakage of the dielectric material. A metallic cone-shaped stress relief device mounted in the terminator and electrically connected to the cable by means of a seal at the cable entrance portion of the pothead. This seal has a triangular shaped cross section of conducting rubber material which is mounted in the pothead so that it can be deformed or contracted by a gland nut. The seal is provided with an inwardly extending lip portion which has an enlarged cross section adjacent the inner periphery thereof. A removable plug which is displaced by the insertion of the cable is provided to seal the opening formed by this lip portion to prevent leakage of dielectric material from the pothead before the cable is inserted.

40 Claims, 7 Drawing Figures

INVENTORS
ARGUS F. PARKS
BYRON G. DARNELL

*John F. Booth*
ATTORNEY

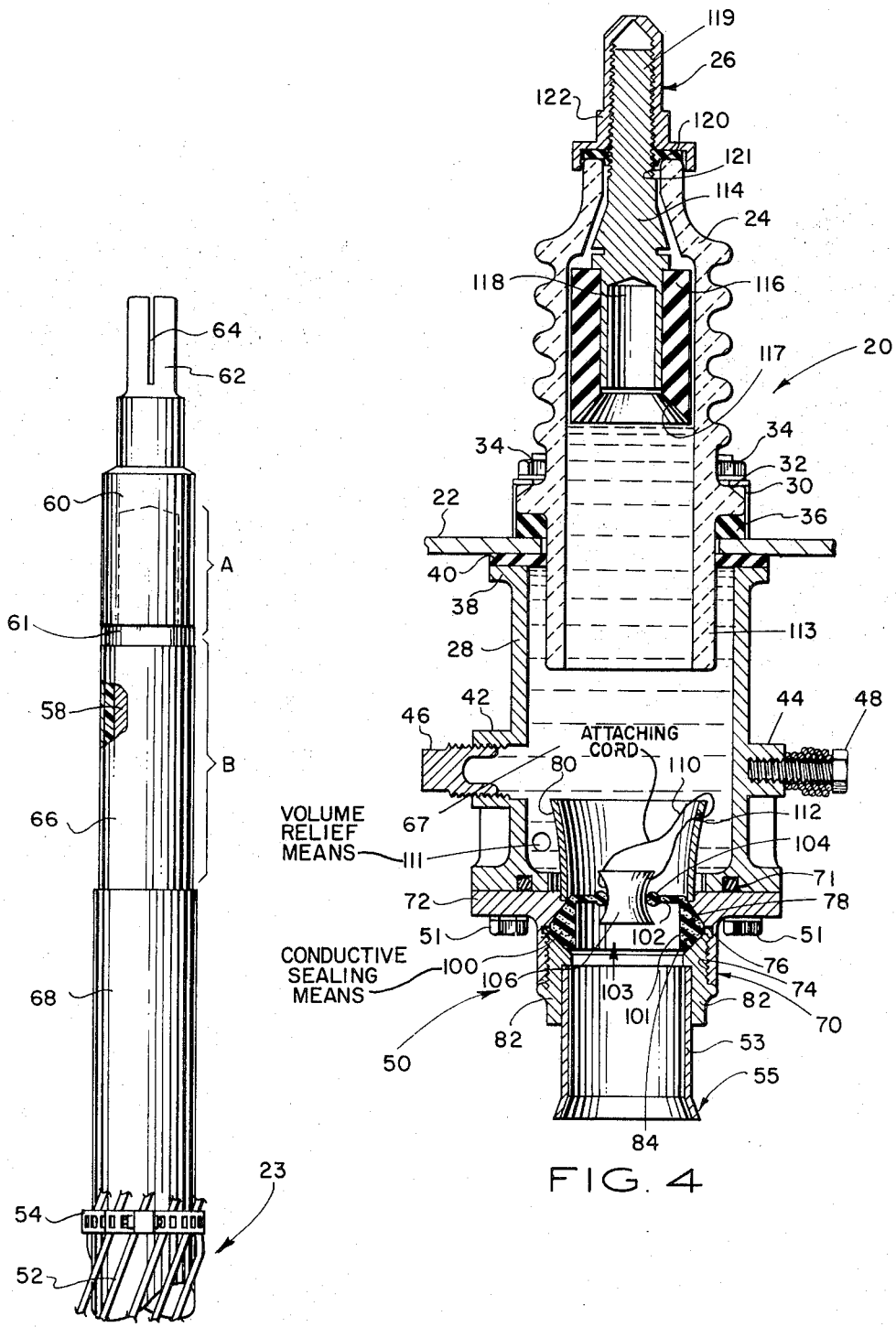

INVENTORS
ARGUS F. PARKS
BYRON G. DARNELL

John J. Booth
ATTORNEY

POTHEAD CONSTRUCTION AND METHOD OF TERMINATING A POWER CABLE THEREWITH

The present invention relates generally to improvements in cable terminators, potheads and the like and more particularly to a new and improved cable terminator and method for electrically connecting a high voltage cable to a transformer, switch, fuse, circuit breaker or the like. The terminator of the present invention is pre-filled at the factory with dielectric material before the insertion of the cable and is provided with a unique compressible and deformable seal for contracting and sealing on the exterior of the cable as well as preventing leakage of the dielectric material before and during attachment of the cable to the terminator. The seal also functions to electrically connect the exterior shield of the cable to a metallic stress relief cone which is mounted within the terminator.

In the termination of high voltage shielded power cables, it has been a general practice to utilize cable terminators which are filled with dielectric material and have a seal means adjacent their base for preventing leakage and contamination of the dielectric material contained in the terminator. These terminators generally utilize a sealing configuration wherein a conventional seal having a central aperture for insertion of the cable therethrough is utilized. This conventional seal is constructed from resilient material and will contact and seal around the periphery of the cable after insertion into the terminator. Although such seals served their purpose, they were not entirely satisfactory when used with terminators which were pre-filled with dielectric material for the reason that they failed to adequately prevent leakage of dielectric material before, during and after the insertion of the cable therein.

In an attempt to solve the leakage problem before insertion, it was proposed to seal a terminator by utilizing a fragile diaphragm seal to cover and seal the aperture in the conventional seal. This fragile diaphragm was strong enough to block the aperture in the center of the conventional seal yet was fragile enough to tear or break as the cable was inserted into the terminator. Although this configuration was effective to prevent leakage of dielectric material before the insertion of the cable, it has sometimes caused leakage of dielectric material during the insertion of the cable into the terminator. This is partly due to the fact that the diaphragm will tear or break in an unpredictable or uneven manner. The uneven edge formed by this break of the diaphragm will not normally provide an effective seal during insertion of the cable into the terminator and will inhibit other seals from sealing on the exterior of the cable, thus allowing the dielectric material to leak from the terminator during the insertion process.

The general purpose of this invention is to provide an improved seal configuration for terminators for a high voltage shielded power cable and to attain this result, the present invention contemplates the use of a unique seal structure whereby effective sealing is obtained. To solve the problem of leakage of dielectric material before the cable is inserted, a removable plug is used. This plug effectively seals the opening in a seal that is removable at the time the cable is inserted through the seal.

To solve the problem of leakage of dielectric material after the cable is inserted into the device a deformable cross section annular seal body is provided. This body is positioned to be radially deformed by a gland nut to reduce the interior diameter of the seal to clamp on the exterior of the cable.

To solve the problem of leakage of dielectric material during the insertion of the cable into the device, a deformable radially extending lip portion with an enlarged portion adjacent its internal periphery is provided on the seal body. This lip portion is strong, yet flexible enough to contact the smallest diameter portion of the cable and its connector as the cable is inserted into the terminator to prevent leakage of dielectric material during the insertion process. In addition, the lip portion acts as a seal against the exterior of the cable to improve the sealing efficiency of the seal after the cable is inserted into the device.

In addition, the seal is of a shape and position within the device so that it can be made of conductive material and can be compressed or deformed against the exterior of the portion of the cable and a stress relief cone to provide electrical contact between the stress relief cone and the exterior of the cable to reduce stress concentration within the terminator.

An object of the present invention is the provision of an improved cable terminator device and seal for use in, and an improved method for, the termination of high voltage shielded power cables.

An additional object is the provision of an improved deformable seal for cable terminators.

Another object of the present invention is to provide a cable terminator which is pre-filled with dielectric material at the factory.

A further object of the present invention is the provision of a cable terminator with a simple metallic stress relief cone.

Still another object of the present invention is to provide the seal for a cable terminator which is inexpensive and effective to prevent leakage of dielectric material before, during and after installation of the cable.

A further object of the present invention is the provision of a seal which provides improved electrical contact between the exterior of the cable and a stress relief cone.

Still another object of the present invention is the provision of a cable terminator device which utilizes a fixed stress relief cone.

Still a further object of the present invention is to provide a cable terminator which is simple and inexpensive to manufacture and use.

Other objects and many of the attendant advantages of this invention will be readily appreciated by those of ordinary skill in the art as the same becomes better understood by reference to the following detailed description when considered in connection with the accompanying drawings, in which:

FIG. 3 is a detail view of the end of a cable prepared for connection with the cable terminator of the present invention;

FIG. 4 is a section view of the cable terminator with the cable removed, looking in the direction of arrows 4—4 in FIG. 1;

DESCRIPTION

Figure 1:
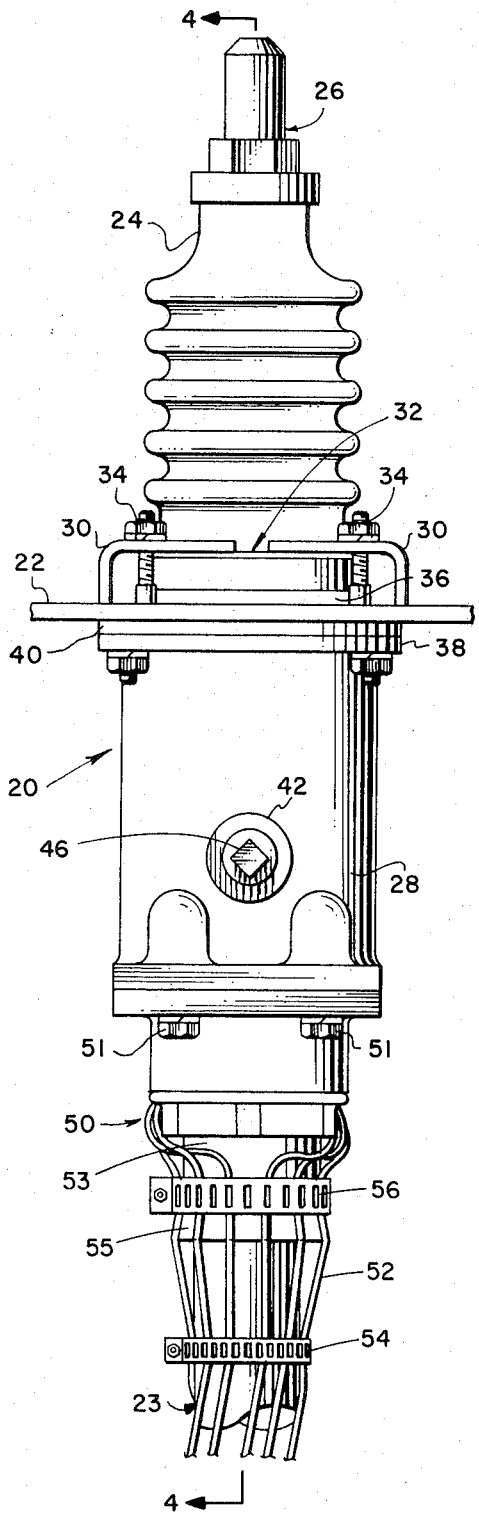
FIG. 1 illustrates a front elevation of an embodiment of the cable terminator of the present invention.
Figure 2:
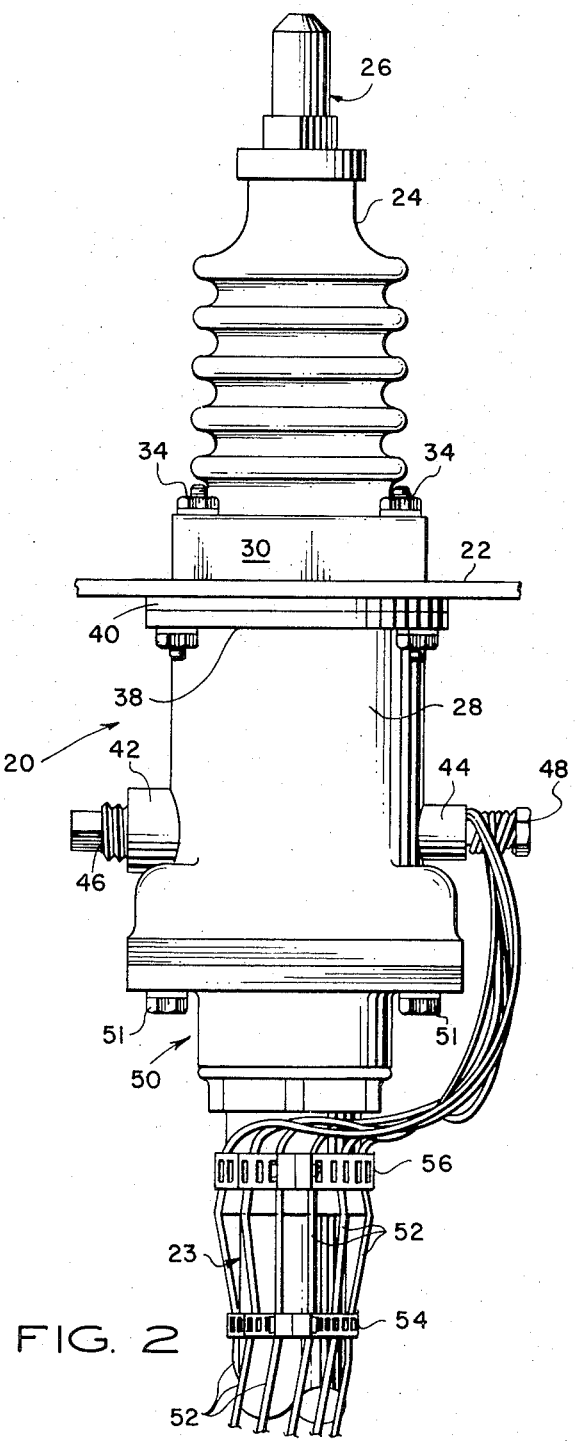
FIG. 2 illustrates a side elevation of the terminator.

Referring now to the drawings, wherein like reference characters designate like or corresponding parts throughout the several views, there is shown in FIGS. 1 and 2 a hollow cable terminator device generally designated 20 mounted on and supported by plate 22. This terminator device 20 is of the type which is pre-filled with dielectric material at the factory, so that a cable 23 may be electrically connected to the device 20 by insertion through an opening without the necessity of filling the terminator device with dielectric material at the time of connection. This terminator device 20 has a hollow porcelain insulator portion 24, a hollow body portion 28 and a connector means 26 to which an external cable means or other electrical connection (not shown) may be attached. The insulator portion 24 is positioned above the plate 22 and has a generally conical shape while the body portion 28 is positioned below the plate 22 and has a generally cylindrical shape. Seals 36 and 40 are provided between the plate 22 and the insulator 24 and body 28, respectively, to prevent leakage of dielectric material from the interior thereof.

The cable terminator device 20 is attached to the plate 22 by means of two L-shaped mounting clamps 30 and a plurality of fastener assemblies 34 which removably engage flange 38. The mounting clamps 30 have their shorter legs abutting plate 22 with the longer leg engaging a shoulder 32 on the insulator portion 24 to hold the device 20 against the plate 22.

The body portion 28 has two integrally formed bosses 42 and 44 which radially extend from opposite sides. Both of the bosses 42 and 44 are provided with bores which are internally threaded for purposes which will be hereinafter described. The bore in the boss 42 is internally threaded and provides access to the interior of the terminator so that dielectric material may be added to or removed from the terminator as required. A filling plug 46 is in threaded sealing engagement with the boss 42 and an attachment means 48 is in threaded engagement with the boss 44.

A sealing portion 50 for sealing around the exterior of cable 23 is attached by means of fasteners 51 to the bottom of the body 28. This sealing portion 50 has an extending cable skirt 53 which is flared at 55.

To ground the exterior of the cable 23 to the terminator 20, a plurality of concentric wires 52 are wound around and attached to the exterior of the cable 23 by means of a plurality of collapsible collars 54. These concentric wires 52 are attached to the cable skirt 53 by means of a collapsible collar 56 to electrically connect the insulation of the cabling to the sealing portion 50 with the flared portion 55 retaining the collar on the skirt 53. The concentric wires are then connected to the attachment means 48 which engages the boss 44 to electrically connect the wires to the body portion 28 to prevent charge buildups in the insulation of the cabling.

Turning now to FIG. 3, a detailed view of the end of the cable 23 prepared for insertion into the terminator can be seen as having a central conductor 58 from which the insulation has been stripped back a distance A so that the conductor 58 is exposed and can be inserted in and connected to a male connector 60. This male connector 60 has a cylindrical extending portion 62 with a groove 64 cut therein. Insulator material 66 concentrically surrounds the conductor 58 and a conducting jacket 68 concentrically surrounds the insulating material 66. The conducting material 68 is stripped off a distance B to expose a portion of the insulating material 66. Once the male connector 60 has been attached to the end of the conductor 58, a neoprene tape 61 or the like is wrapped around the cable to fill the groove formed between the insulating material 66 and the connector 60. It is also to be noted that in FIG. 3 the concentric wires 52 are shown attached to the cabling, but it is to be understood, of course, that the wires could be attached after the cable 23 is inserted in the terminator 20.

Figure 5:
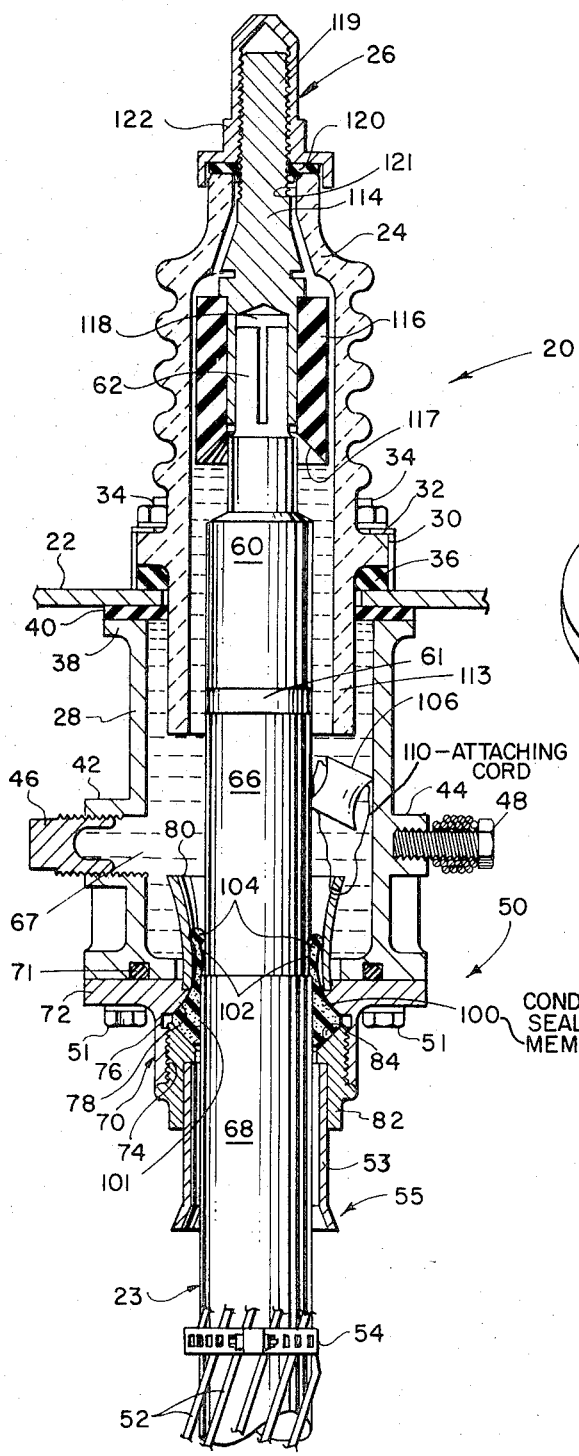
FIG. 5 is a section view similar to FIG. 4, with the cable in place.

Turning to FIGS. 4 and 5, the hollow interior chamber 67 and interior structure of the terminator 20 can be seen.

This chamber 67 is filled with dielectric material and is shown in FIG. 4 prior to insertion of the cable 23 therein, and in FIG. 5 is shown with the cable inserted therein.

The sealing portion 50 is assembled from an outer ring shaped member 70, a stress cone 80, a gland nut 82 and a seal 100. The ring shaped member 70 has a radially extending flange 72 with suitable bores therein through which fasteners 51 are inserted to attach the ring 70 to the body portion 28. An O-ring seal 71 is mounted in a groove in the mating surface of the body portion 28 to act as a seal between the ring 70 and body portion 28. The ring 70 is provided with internal threads 74 which terminate at an annular groove 76. An inclined annular sealing surface 78 extends from the opposite side of the groove and a stress cone 80 is attached to the ring 70 adjacent the sealing surface 78. This cone is formed from a metallic material which can have the same composition as the ring shaped member 70 so that the cone 80 can be attached to the ring 70 by welding or other suitable means. For reasons which will hereinafter be more fully described, it is important that good electrical connection be formed between the ring 70 and the cone 80.

The externally threaded gland nut 82 is provided with an annular sealing surface 84 which, when the gland nut 82 is engaged within the ring 70, is adjacent the surface 78. The cable skirt 53 is shown attached to the interior of the gland nut 82 adjacent its upper end.

Figure 6:
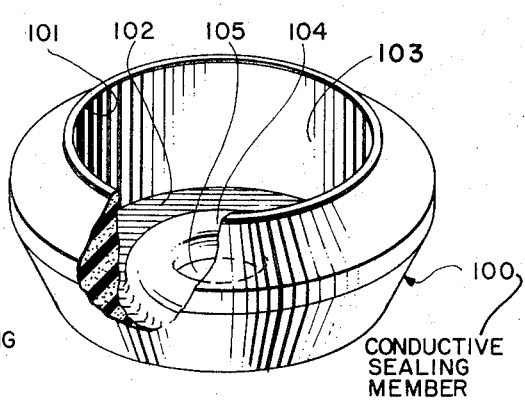
FIG. 6 is a perspective view of the annular seal used to seal between the cable terminator and the cable.
Figure 7:
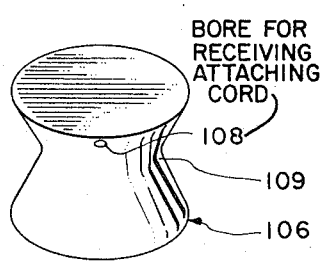
FIG. 7 is a perspective view of the sealing plug used to seal the annular seal.

Annular seal 100 is positioned between the two sealing surfaces 78 and 84 and is shown in detail in FIG. 6 as having a generally triangular cross section with a cylindrical sealing surface 101 defining opening 103. The seal 100 also has an internally extending lip 102 which has an enlarged cross section 104 adjacent its internal periphery which defines an opening 105, the diameter of which is less than the diameter of the extending portion 62, for reasons which will be hereinafter described. To prevent leakage of dielectric material from the terminator, a sealing plug 106 (which is shown in detail in FIG. 7) is inserted into the opening 105. This sealing plug 106 has a reduced diameter central portion 109 and a bore 108 through which a suitable attaching cord 110 is inserted. This attaching cord 110 is in turn passed through an opening 112 in the stress cone 80 to limit the movement of the sealing plug 106 when the plug is displaced from the opening 105. By constructing the plug 106 with a reduced central portion 109, the plug 106 will be retained within the opening 105, thus preventing unintentional removal.

The threaded engagement between the gland nut 82 and the ring shaped member 70 allows the parts to be axially moved with respect to each other to compress and deform the annular seal 100 (as shown in FIG. 5) to decrease the diameter of the sealing surface 101 and to clamp on and seal around the cable as shown in FIG. 5. The seal also can be made from conductive material and is positioned, when compressed, as in FIG. 5 to contact and provide electrical connection between the exterior of the cable 23 and the cone 80 and sealing surface 78. This electrical contact performs the function of conducting charges from the exterior of the cable to the cone 80 to reduce stress concentration in this area.

A volume relief means 111 can also be provided in the chamber to allow for the thermal expansion of the dielectric material therein and can be in the form of a volume of gas retained in a flexible container or any other suitable means which is well known in the fluid art.

The insulator 24 has a portion 113 at one end which axially extends into the body portion 28 with a female connector 114 centrally disposed in the other end. This connector 114 is held in position by a nylon guide sleeve 116 which is countersunk at one end to provide a guide surface 117. The female connector 114 has a socket 118 centrally disposed in one end which socket is of a size to receive the extending portion 62 of the male connector 60 with the guide surface 117 acting as a guide during the insertion of the extending portion 62 into the socket 118. The other end of the female connector 114 forms an externally threaded stud 119 which extends axially through an opening 121 in the upper end of the insulator 24. An annular seal 120 and an internally threaded hood nut 122 are utilized to sealingly attach the female connector 114 to the insulator 24.

ATTACHMENT PROCEDURE OF THE CABLE TERMINATOR

The advantages and features of the invention will become more apparent from a consideration of the method of attaching the cable to the terminator by reference to FIGS. 3, 4 and 5.

The cable 23 is prepared as illustrated in FIG. 3 with the insulation 66 and conducting material removed from area A and only the conducting material removed from area B. The lengths of areas A and B are dictated by the internal dimensions of the terminator 20 and can be supplied to the installer with the terminator 20. The male connector 60 is then attached to the cable conductor 58 in the area A as previously described and neoprene tape 61 is wound thereon to fill the gap between the connector 60 and the area B.

The filling plug 46 is removed and a suitable receptacle is placed thereunder to catch and retain any dielectric material displaced from the terminator. The gland nut 82 is also unscrewed to relax seal 100 to allow for insertion of the cable therethrough. Next, the cable 23 with the male connector 60 is inserted through the seal 100, displacing the sealing plug 106 from the opening 105. As can be seen in FIG. 5, the plug 106 will be moved into the chamber 67, but be restrained in the vicinity of the stress relief cone 80 by cord 110, thus preventing the plug from becoming lodged in socket 118. As the cable 23 and male connector are inserted into the chamber 67 through the seal 100, dielectric material will be displaced through boss 42 and be caught by the receptacle provided.

It is Also, to note that during insertion of the cable 23 into the chamber 67, the seal 100 is in an uncompressed state and therefore the internal diameter of sealing surface 101 is enlarged to allow the cable to slide therethrough. Also at the initiation of the insertion of the cable 23, the male connector 60 and insulator 66 in areas A and B will be within the seal 100. During this time, the cable 23 will be displacing dielectric material from the chamber 67, thus requiring the seal 100 to seal on the male connector 60 and reduced diameter insulator 66 in area B so that dielectric material will not leak past the seal. It is during this time that the lip 102 provides a running seal on the connector and cable 23. This is due to the fact that opening 105 is smaller than the external diameter of the male connector 60 and the insulator 66, thus allowing the enlarged cross section 104 of the lip 102 to slide along and seal on the exterior of the male connector 60 and insulator 66 during insertion of the cable 23 into the terminator 20. The enlarged cross section 104 also assists during this process by strengthening the lip and preventing it from tearing during insertion and by providing additional force to resiliently contract the lip tightly onto the exterior of the cable to increase the sealing efficiency.

As the male connector 60 approaches the female connector 114, the extending portion 62 is guided into socket 118 by the surface 117 on the guide sleeve 116. The extending portion 62 is of a slightly larger diameter than the socket 118 so that the extending portion 62 is pressed into the socket which helps retain the members in engagement.

The filling plug 46 is then replaced and the gland nut 82 is tightened to compress the seal 100 between sealing surfaces 78 and 84. It is important to note that not only is sealing surface 101 compressed against the exterior of the cable but also the lip 102 is resiliently held against the exterior of the cable and acts as a gland which is pressed harder against the exterior of the cable as the pressure within the terminator increases, thus improving the sealing efficiency. Also, this compression of the seal against the exterior of the cable surface 68 and cone 80 improves the electrical contact between the exterior of the cable and the cone 80.

The attachment of the cable 23 to the terminator is completed by attaching the concentric wires to the skirt 53 and attachment means 48.

Obviously, many modifications and variations of the present invention are possible in light of the above teachings. It is therefore to be understood that within the scope of the appended claims, the invention may be practiced otherwise than as specifically described.

What is claimed and desired to be secured by Unites States Letters Patent is:

1. Cable termination apparatus for terminating and receiving an elongated power cable of the type have an exposed electrically conductive portion on one end thereof, said apparatus comprising:
   a. a housing defining an elongated chamber for receiving said power cable, said housing having connection means disposed at one end thereof for electrical connection with the exposed conductive portion of said cable, said housing further having an opening disposed at an end opposite from said one end for allowing the insertion of said power cable into said chamber,
   b. fluid-like insulating material within said chamber, and
   c. sealing means at said opening for preventing leakage, loss, or contamination of said insulating material through said opening before, during, and after the insertion of said power cable into said chamber, said sealing means comprising:
      i. a sealing surface circumferentially defined by, and extending into, said opening, said sealing surface defining a generally centrally disposed defined aperture, and
      ii. plug means removably disposed within said defined aperture and sealing said aperture prior to the insertion of said power cable into said chamber.

2. Apparatus as defined in claim 1 wherein said sealing surface is constructed from conducting material.

3. Apparatus as defined in claim 1 wherein said sealing means comprises an annular sealing surface and clamping means for deforming said sealing surface to alter the internal diameter thereof.

4. Apparatus as defined in claim 1 wherein said sealing surface defines an annular seal, said annular seal having a body portion with a triangular shaped cross section, the internal surface of said annular seal forming a first cable contacting and sealing surface, said first sealing surface defining a first opening of a diameter larger than the external diameter of said cable, and a lip portion extending radially inward from said body portion, the inner surface of said lip forming a second sealing surface and defining said aperture having a diameter which is less than the external diameter of said cable, said lip having an enlarged thickness at said second sealing surface.

5. Apparatus as defined in claim 4 wherein said annular seal is made of conductive material.

6. Apparatus as defined in claim 1, wherein said plug means has means attached thereto to restrict migration of said plug means in said chamber.

7. A method of terminating a power cable which consists of the steps of preparing the terminal end of the power cable for insertion in a factory assembled terminator device which is pre-filled with fluid dielectric insulating compound and which is sealed within the device, inserting the prepared end of the cable within the device by displacing a seal plug from an opening provided in a diaphragm of elastomeric material located at the entrance end of the device, and continuing the insertion of the cable end so that the same passes through said opening provided in said diaphragm, said opening having a diameter smaller than that of the connector attached to the terminal end of the cable whereby the diaphragm maintains a running seal with the exterior of the connector and the cable during insertion, allowing the excess compound to discharge from the device through an opening provided for the purpose, continuing the insertion of the cable until the end of the same makes electrical contact with a mating connector located in the device opposite the entrance end, closing and sealing the discharge opening to retain the remainder of the dielectric compound within the terminator device and deforming an annular seal to contract and seal on the exterior of said cable.

8. A device for connection to a shielded electric cable having a central conductor, a concentrically disposed insulator and an outer conducting jacket, which comprises:
   a housing defining an elongated chamber, said housing having a circular opening at one end thereof for allowing insertion of the end of said cable into said housing;
   connector means mounted within said chamber for electrical connection to said cable conductor;
   fluid dielectric insulating material in said chamber;
   a metallic hollow fructrum shaped stress relief member mounted adjacent said one end, said stress relief member so positioned to surround said cable when said cable is inserted through said opening; and
   sealing means for preventing leakage, loss and contamination of said dielectric material from said opening before, during and after said cable is inserted into said housing, and for conducting electric charge from the outer conducting jacket to said stress relief member when said cable is inserted through said opening to reduce electrical stress concentration, said sealing means comprising:
      i. a sealing surface circumferentially defined by, and extending into, said opening, said sealing surface defining a generally centrally disposed defined aperture, and
      ii. plug means removably disposed within said defined aperture and sealing said aperture prior to the insertion of said power cable into said chamber.

9. A device as defined in claim 8 wherein said sealing means comprises a sealing member which is constructed from conducting material.

10. A device as defined in claim 8 wherein said sealing means comprises an annular seal member and clamping means for deforming said seal member to alter the internal diameter of said seal.

11. A device as defined in claim 8 wherein said sealing means comprises an annular seal, said annular seal having a body portion with a triangular shaped cross section, the internal surface of said seal forming a first cable contacting and sealing surface, said first sealing surface defining a first circular opening of a diameter larger than the external diameter of said cable, and a lip portion extending radially inward from said body portion, the inner surface of said lip forming a second sealing surface of a diameter which is less than the external diameter of said cable, said lip having an enlarged thickness at said second sealing surface.

12. A device as defined in claim 11 wherein said annular seal is made of conducting material.

13. A device as defined in claim 11 wherein said plug means removably seals said second sealing surface.

14. A device as defined in claim 13, wherein said plug means is attached to said stress relief member to prevent migration of said plug means into said connector means.

15. A device for use in sealing the opening in a cable termination device comprising:
   an annular seal constructed from resilient conductive material having an annular shaped body portion, a first internal cylindrical sealing surface on said seal, and a lip portion extending radially inward from said first cylindrical sealing surface to define a second annular sealing surface on said lip, said lip having an enlarged thickness at said second cylindrical sealing surface.

16. A device as defined in claim 15 wherein said sealing means additionally comprises a plug means for removably sealing with said second annular sealing surface.

17. A device as defined in claim 16 wherein said plug has a circular cross section and has a reduced diameter portion adjacent the axial center of said plug.

18. A device as defined in claim 15 wherein said body portion has an isosceles triangular shaped cross section, the base of said triangular cross section being parallel to the axis of said seal and forming said first cylindrical sealing surface.

19. A device for connection to a shielded electric cable having a central conductor and a concentrically disposed insulator, which comprises:
   a housing defining a chamber, said housing having a circular opening at one end thereof for allowing insertion of the end of said cable into said housing;
   connection means mounted within said chamber adjacent said other end of said housing for electrical connection to said cable;
   fluid dielectric insulating material in said chamber;
   first annular seal means for preventing leakage, loss and contamination of said dielectric material before and during insertion of said cable through said opening; and
   second annular seal means with a central cable port axially positioned in said opening for surrounding the circumference of said cable when said cable is inserted through said opening and deformable between a first relaxed shape wherein said cable port is of a size to allow the axial insertion of said cable through said port and a second deformed shape wherein said cable port is reduced in diameter and said second seal is compressed against the exterior of said cable for preventing leakage, loss and contamination of said cable through said opening, and plug means removably disposed within said cable port for sealing said port prior to the said insertion of said cable.

20. A device as defined in claim 19 wherein said second seal means comprises an annular seal member and clamping means for deforming said seal member to alter the internal diameter of said seal.

21. A device as defined in claim 19 wherein said second annular sealing means has a body portion with a triangular shaped cross section, the internal surface of said seal forming a first cable contacting and sealing surface, said first sealing surface defining said cable port or a diameter larger than the external diameter of said cable, and said first sealing means comprising a lip portion extending radially inward from said body portion, the inner surface of said lip forming a second sealing surface of a diameter which is less than the external diameter of said cable, said lip having an enlarged thickness adjacent said second sealing surface.

22. A device as defined in claim 21 wherein said plug means removably seals said second sealing surface.

23. A device for connection to a shielded electric cable having a central conductor and a concentrically disposed insulator, which comprises:
   a housing defining a chamber, said housing having a circular opening at one end thereof for allowing insertion of the end of said cable into said housing;
   connection means mounted within said chamber adjacent said other end of said housing for electrical connection to said cable;
   fluid dielectric insulating material in said chamber;
   metallic hollow stress relief member mounted adjacent said one end, said stress relief member so positioned to surround said cable when said cable is inserted through said opening;
   first annular seal means for preventing leakage, loss and contamination of said dielectric material before and during insertion of said cable through said opening; and
   second annular seal means with a central cable port axially positioned in said opening for surrounding the circumference of said cable when said cable is inserted through said opening and deformable between a first relaxed shape wherein said cable port is of a size to allow the axial insertion of said cable through said port and a second deformed shape wherein said cable port is reduced in diameter and said second seal is compressed against the exterior of said cable for preventing leakage, loss and contamination of said dielectric material through said opening after insertion of said cable through said opening, and for conducting electric charges from the exterior of said cable to said stress relief member.

24. A device as defined in claim 23 wherein said second seal means comprises an annular seal member and clamping means for deforming said seal member to alter the internal diameter of said seal.

25. A device as defined in claim 23 wherein said second annular sealing means has a body portion with a triangular shaped cross section, the internal surface of said seal forming a first cable contacting and sealing surface, said first sealing surface defining said cable port or a diameter larger than the external diameter of said cable, and said first sealing means comprising a lip portion extending radially inward from said body portion, the inner surface of said lip forming a second sealing surface of a diameter which is less than the external diameter of said cable, said lip having an enlarged thickness adjacent said second sealing surface.

26. A device as defined in claim 25 wherein said first sealing means additionally comprises a plug means for removably sealing said second sealing surface.

27. In combination:
   a shielded electric cable having a central conductor and a concentrically disposed insulator;

first connector means electrically connected to the conductor at one end of said cable; and cable terminator means comprising a housing defining a chamber, said housing having an opening at one end corresponding in shape to the cross section of said cable, second connector means mounted within said chamber removably receiving and electrically connecting with said first connector means, fluid dielectric insulating material in said chamber, and sealing means for preventing leakage, loss and contamination of said dielectric material through said opening before said first connector and said end of said cable is inserted through said opening, for providing a sliding seal on said first connector and said one end of said cable to prevent leakage, loss and contamination of said dielectric material during the insertion of said first connector and said one end of said cable through said opening, and for preventing leakage, loss and contamination of said dielectric material after said cable and said first connector means are inserted through said opening to electrically connect said first and second connector means, said sealing means comprising:

i. a sealing surface circumferentially defined by, and extending into, said opening, said sealing surface defining a generally centrally disposed defined aperture, and ii. plug means removably disposed within said defined aperture and sealing said aperture prior to the insertion of said power cable into said chamber.

28. The combination as defined in claim 27 wherein said sealing means comprises a sealing member which is constructed from conducting material.

29. The combination as defined in claim 27 wherein said sealing means comprises an annular seal member and clamping means for deforming said seal member to alter the internal diameter of said seal.

30. The combination as defined in claim 27 wherein said sealing means comprises an annular seal, said annular seal having a body portion with a triangular shaped cross section, the internal surface of said seal forming a first cable contacting and sealing surface, said first sealing surface defining a first circular opening of a diameter larger than the external diameter of said cable, and a lip portion extending radially inward from said body portion, the inner surface of said lip forming a second sealing surface of a diameter which is less than the external diameter of said cable, said lip having an enlarged thickness at said second sealing surface.

31. The combination as defined in claim 30 wherein said annular seal is made of conductive material.

32. The combination as defined in claim 30 wherein said plug means removably seals said second sealing surface.

33. The combination as defined in claim 32 wherein said plug means has means attached thereto to prevent migration of said plug means into said second connector means.

34. In combination:

a shielded electric electric cable having a central conductor and a concentrically disposed insulator;

first connector means electrically connected to the conductor of one end of said cable;

cable terminator means comprising a housing defining a chamber, said housing having an opening at one end corresponding in shape to the cross section of said cable, second connector means mounted within said chamber removably receiving and electrically connecting with said first connector means, fluid dielectric insulating in said chamber, a metallic hollow frustum shaped stress relief member mounted adjacent said one end, said stress relief member being located to surround said cable when said cable is inserted through said opening; and seal means for preventing leakage, loss and contamination of said dielectric material from said opening before, during and after said cable is inserted into said housing and for providing an electric connection between the exterior of the insulator and said stress relief member when said cable is inserted through said opening so that electrical stress concentration is reduced, said sealing means comprising:

i. a sealing surface circumferentially defined by, and extending into, said opening, said sealing surface defining a generally centrally disposed defined aperture, and ii. plug means removably disposed within said defined aperture and sealing said aperture prior to the insertion of said power cable into said chamber.

35. The combination as defined in claim 34 wherein said sealing means comprises a sealing member which is constructed from conducting material.

36. The combination as defined in claim 34 wherein said sealing means comprises an annular seal member and clamping means for deforming said seal member to alter the internal diameter of said seal.

37. The combination as defined in claim 34 wherein said sealing means comprises an annular seal, said annular seal having a body portion with a triangular shaped cross section, the internal surface of said seal forming a first cable contacting and sealing surface, said first sealing surface defining a first circular opening of a diameter larger than the external diameter of said cable, and a lip portion extending radially inward from said body portion, the inner surface of said lip forming a second sealing surface of a diameter which is less than the external diameter of said cable, said lip having an enlarged thickness at said second sealing surface.

38. The combination as defined in claim 37 wherein said annular seal is made of conducting material.

39. The combination as defined in claim 37 wherein said plug means removably seals said second sealing surface.

40. The combination as defined in claim 37, wherein said plug means is attached to said stress relief member to prevent migration of said plug means into said second connector means.

* * * * *